(12) United States Patent
van Weel

(10) Patent No.: US 6,804,912 B2
(45) Date of Patent: Oct. 19, 2004

(54) METHOD, DEVICE AND WAREHOUSE FOR CULTIVATING CROP PLANTS AND GRAFTS THEREOF

(75) Inventor: Peter van Weel, Naaldwijk (NL)

(73) Assignee: Agrifirm B.V., Meppel (NL)

( * ) Notice: Subject to any disclaimer, the term of this patent is extended or adjusted under 35 U.S.C. 154(b) by 0 days.

(21) Appl. No.: 10/323,580

(22) Filed: Dec. 18, 2002

(65) Prior Publication Data

US 2003/0121205 A1 Jul. 3, 2003

Related U.S. Application Data

(63) Continuation of application No. PCT/NL01/00453, filed on Jun. 18, 2001.

(30) Foreign Application Priority Data

Jun. 19, 2000 (EP) ............................................ 00202138

(51) Int. Cl.[7] .............................................. A01G 31/04
(52) U.S. Cl. .................................. 47/62 R; 47/58.1 R
(58) Field of Search ................................ 47/32.4, 32.7, 47/65.7, 65.8, 76, 62 R, 6, 7, 17, 58.1 R (56) References Cited

U.S. PATENT DOCUMENTS 3,667,157 A  *  6/1972  Longhini .................... 47/59 R
4,035,949 A  *  7/1977  Ruthner ......................... 47/17
4,813,176 A  *  3/1989  Takayasu .................... 47/59 R
5,584,140 A     12/1996 Byrne
6,233,870 B1 *  5/2001  Horibata ..................... 47/62 R
6,378,246 B1 *  4/2002  DeFoor ....................... 47/62 R

FOREIGN PATENT DOCUMENTS

| EP | 0021963 | | 1/1981 | |
| EP | 406803 A1 | * | 9/1991 | ............ A01G/9/14 |
| EP | 1190620 A1 | * | 3/2002 | ............ A01G/9/14 |
| JP | 07031306 A | * | 2/1995 | .......... A01G/31/02 |
| JP | 2001346427 A | * | 12/2001 | .......... A01D/34/00 |
| SU | 1540739 A | * | 2/1990 | .......... A01G/31/02 |
| WO | WO 96/29855 | | 10/1996 | |
| WO | WO 97/26786 | | 7/1997 | |
| WO | WO 01-097599 | | 6/2001 | |

OTHER PUBLICATIONS

PCT International Search Report, PCT/NL01/00453, dated Jan. 30, 2002.

* cited by examiner

*Primary Examiner*—Son T Nguyen
(74) *Attorney, Agent, or Firm*—TraskBritt (57) ABSTRACT

A method for cultivating crop plants having a shoot-root plant body, wherein during growing, part of the stem adjacent the roots is prepared such that new roots grow on the stem part of the plant. The new roots are brought into contact with a growth medium, such that during production of a crop, the length of the stem between the shoot furthest from the roots and the roots in contact with the grow medium closest to the shoot is maintained at a relatively short length as compared to a normal length of the plant of substantially the same age.

17 Claims, 6 Drawing Sheets

METHOD, DEVICE AND WAREHOUSE FOR CULTIVATING CROP PLANTS AND GRAFTS THEREOF

CROSS-REFERENCE TO RELATED APPLICATIONS

This application is a continuation of PCT/NL01/00453, filed Jun. 18, 2001, designating the United States of America, corresponding to PCT International Publication WO 01/97599 (published in English on Dec. 27, 2001), the contents of which are incorporated herein in its entirety.

TECHNICAL FIELD

The invention relates to a method for cultivating crop plants having a shoot-root plant body, wherein during growing, part of the stem is prepared such that new roots grow on the stem part. The new roots are brought into contact with a growth medium, such that during production of the crop, the stem length between the shoot furthest from the roots and the roots in contact with the growth medium and closest to the shoot is maintained at a relatively short length as compared to a normal length of the plant of the same age. The crop plants include, but are not limited to, tomatoes, cucumbers, egg-plants, peppers and other known plants.

BACKGROUND

French patent application FR 2 769 463 discloses a method for growing palm trees, in which each palm tree is allowed to grow to a relatively large height. After this growth, a collar is provided around the stem of the palm tree very close to the leaves and coconuts far away from the ground where the original roots of the palm tree grow. New root growth is stimulated in the collar. Once new roots have sufficiently grown, the stem is cut between the old roots and the new roots after which the old roots, with the long stem attached thereto, are excavated and discarded. After the old roots are excavated and discarded, the procedure is repeated.

Dutch Patent NL 1 007 449 discloses a method for growing crops wherein the crops are grown from substrate troughs filled with a growth medium. The troughs are height adjustable and suspended from an adjustable suspension means. Stems of the plants are tied up, for instance, by a wire attached to the upper ends of the plants after the plants reach a certain length. After crops are harvested from a lower end of the plant, the plant is lowered by lowering the wire a certain distance.

Crop plants with a shoot-root plant normally grow from the top wherein the crop grows near the top of the plant. Once the crop has grown on part of the plant and has been harvested, the crop-bearing part of the plant will not bear further crop. Crop plants having a shoot-root plant body can grow to great length, for example over 15 m for tomatoes or even over 30 m for cucumbers. The disadvantage is that the distance between the top of the plant, where the crop grows, and the roots, near the bottom of the plant, becomes large. This results in an increasing distance over which nutritious substances travel from the roots to the crop located near the top of the plant and results in smaller crops.

SUMMARY OF THE INVENTION

The present invention relates to a method for cultivating crop plants, in which the disadvantages of known methods are eliminated. To this end a method according to the present invention is includes preparing part of the stem of the plant such that new roots grow on the part of the stem during growth, positioning the growing plant such that the new roots are brought into contact with a growth medium, wherein during production of the crop, a length of the stem between the shoot located furthest from the roots and the roots in contact with the growth medium closest to the shoot is maintained at a relatively short length as compared to a normal stem length of a plant of a similar age and wherein the plant body is suspended, at least partly, from its top.

Suspension of the top of the plant from a suspension means, such that the top part of the plant, more particularly the part of the crop growing part of the plant, extends substantially vertically such that relatively little space is necessary for the plant, whereas proper use can be made of the available light. In a method according to the invention, the plant length is controlled such that the distance between the crop growing part of the plant and the roots in contact with growth medium is maintained at a relatively small distance. Preferably the stem length is kept substantially constant during the life cycle of the crop plant.

By keeping the stem length relatively small, the nutritious materials are transported over a small distance during the life cycle of the crop plant such that optimal crop yields may be harvested during relatively long periods of time. In known methods of cultivating crop plants, the crop plants are removed and replaced by new, young plants after a couple of months since the yield and quality of the crop becomes insufficient. In a method according to the present invention, the life cycle of the plant is extended up to one, or even several years, during which time the yield and quality of the crop is substantially constant and high. A further advantage of a method according to the invention is that the overall length of the plant will remain relatively short during the life cycle thereof. The basically useless or unfavorable part of the stem located between the roots in contact with the growth medium and the crop growing part of the plant, on which part of the plant no crop grows and is normally about several meters long, is kept short. Therefore, the part does not obstruct passage ways, floor space or occupy other room around the plant and enables easier harvesting of the crop.

Preparing part of the stem for new roots to grow thereon is to be understood in this application as at least meaning positioning the stem part in or on growth medium, such as water, earth, glass-wool, rock-wool or similar growth medium. The stem part can also be mechanically and/or chemically treated by any known means to initiate or accelerate root growth.

In one embodiment, a method according to the present invention includes preparing part of the stem of the plant such that new roots grow on the part of the stem during growth, positioning the growing plant such that the new roots are brought into contact with a growth medium, wherein during production of the crop, a length of the stem between the shoot located furthest from the roots and the roots in contact with the growth medium closest to the shoot is maintained at a relatively short length as compared to a normal stem length of a plant of a similar age and wherein the plant body is suspended, at least partly, from its top, and wherein the stem part on which the new roots are grown is positioned substantially horizontal and at least, part of the roots distanced from the shoot is positioned at a level higher than, at least, part of the roots, especially higher than the stem part on which the new roots are grown.

Positioning the stem part of the plant substantially horizontally on which the new roots grow has the advantage that the stem part can relatively easily be brought into contact with growth medium, such as water, over a relatively large length. Surprisingly, root growth on the stem part is improved and accelerated by positioning at least part of the existing roots at a level higher than at least part of the stem part on which the new roots are grown. By positioning the root part higher than the stem part on which new roots are to be grown, the normal equilibrium of at least hormones in the crop plant is disturbed such that a lesser amount of root growth inhibiting hormone is transported to the stem and/or more root growing hormone is transported in the direction of the stem part next to the roots for initiating or accelerating root growth thereon. It is believed that auxins contribute to this effect. This effect may be further enhanced by providing a means for blocking root growth on the roots distanced from the part of the plant that the new roots are growing on. This can be obtained by bringing the roots out of contact with the growth medium, by at least partly cutting the roots or any other means of blocking root growth known in the art.

In another embodiment of the present invention, a method includes suspending the top of the plant from a suspension means, periodically lowering the top of the plant such that the plant can grow back up again along the suspension means and wherein during or subsequent to the lowering of the top of the plant, the roots are at least partially retracted in a direction away from the top of the plant a similar distance such that new roots are grown and/or become in contact with the growth medium.

Suspension of the top of the plant from a suspension means such that the top part, more particularly part of the crop growing part, of the plant extends substantially vertically means that relatively little space is necessary for the plant and proper use can be made of the available light. By periodically lowering the top of the plant such that it can grow back on again, meanwhile retracting the roots, at least partly, in a direction away from the top of the plant, a stem part located near, or preferably adjacent, the roots can be brought into contact with growth medium such that new roots can grow on the stem part. In this manner, at least part of the older roots can be brought out of contact with the growth medium.

In this way, the stem length between the roots in contact with the growth medium and the crop growing part of the plant can be regulated during use and be kept at a relatively short and, preferably, substantially constant length. The stem part of the plant on which the roots are to be grown are preferably brought into contact with growth medium in a receiving means. It should be clear to any person skilled in the art that the roots are to be moved relative to the growth medium wherein the receiving means, the growth medium and thus the roots, or both can be moved. It is equally possible to position new growth medium along a part of the stem on which roots are to been grown, after which the growth medium together with the stem part can be retracted.

In another embodiment of the present invention, the method includes positioning the stem part next to the part of the plant on which new roots are grown substantially horizontally and is bearing crop close to harvesting, the crop being suspended substantially vertically from the stem part.

By positioning the crop carrying part of the plant, of which the crop is close to being harvesting, substantially horizontally by suspension, the crop is suspended substantially vertically downward, meaning that the crop can easily be harvested, for example by a (robotic) means, which are placed under the stem part.

In one embodiment, guide means are used, such as a wire; which enables easy movement of the plant, as well as guidance thereof. Clamping means may also be used to connect the plant to the guide means, such that the plant can easily be repositioned along the guide means.

It is preferred that in a method according to the present invention, the roots are bred on water, such as in a tidal system. This has the advantage that the roots and/or the adjacent stem part can easily be moved along the growth medium. Moreover, such growth medium enables easy excess, proper nutrition and other known advantages.

In a method according to the present invention at least part of the root bearing part of the plant can be cut off. This means that the overall length of the plant can be kept relatively short.

The present invention further relates to a device for cultivating crop bearing plants, including a means for receiving at least part of a root bearing part of the plant body, wherein the means for receiving is configured for moving or allowing movement of at least part of the stem of the plant into the means for receiving during growth of the plants and wherein the means for receiving is further configured for inducing or expediting root growth on at least part of the stem.

With a device of the present invention, crop bearing plants with a shoot-root plant body can be easily cultivated wherein during growth, the plants stem length between a crop growing part of the plant and the nearest roots of the plant in contact with growth medium can be kept at a relatively short length. This has the advantage that optimal use can be made of nutrients in crop growing.

The invention further relates to a device and a crop growing plant, wherein the root bearing part of the crop growing plant is at least partly positioned in the means for receiving, a suspension means configured for suspending part of the stem having shoots next to the top of the plant; and wherein at least part of the stem bearing crop, at least substantially ready for harvest, extends substantially horizontally.

By positioning the root bearing part of the plant in the receiving means, part of the stem having shoots near to the top of the plant that are suspended substantially vertically from the suspension means has the advantage that relatively little space is necessary for growth of the plant. In this manner, a relatively large part of the stem on which the roots are to be grown can be brought into contact with growth medium, even if the latter is mainly water. Positioning the crop bearing part of the bearing crop, at least substantially ready for harvest, substantially horizontally has the advantage that this crop can easily be harvested.

The present invention further includes a warehouse including a suspension means positioned above the floor of the warehouse for suspending the plants and a root growing means configured such that the root bearing part of each plant is to be cultivated, at least partly, substantially horizontally and for moving the root bearing part through the root growing means.

In one embodiment, the warehouse further includes a lighting means positioned in the warehouse such that during use, the lighting means extends substantially above the crop bearing parts and the flowering parts of the plants.

By positioning lighting means in the warehouse substantially above the crop bearing and/or the flowering parts of the plants, sufficient light can be provided to the plants. Using a method according to the present invention and devices according to the present invention, the overall height of the plant above the floor of the warehouse can be kept relatively small and constant, such that positioning of the lighting means is possible.

The invention further includes a method for grafting crop plants including positioning a shoot of a crop growing plant substantially horizontally in a receiving means, such that at least one leaf of the plant extends outside the receiving means and wherein the shoot is brought into contact with a growth medium inside the receiving means for growing roots on the shoot.

Using shoots of a crop growing plant for grafting crop plants has the advantage that substantially the same plants can be obtained having the desired characteristics of the crop growing plant.

DETAILED DESCRIPTION

In this description of the various embodiments of the present invention, identical or corresponding parts have identical or corresponding reference signs, increased by a hundred or multiples thereof. As described herein, a crop plant having a shoot-root plant body is understood to include, at least, plants which primarily grow from the top away from the roots, wherein the crop grows near the top. Once the crop has grown on part of the plant, such as the stem, no further crop will grow on the part. Plants having such shoot-root plant body include, without limitation, tomatoes, cucumbers, eggplants, peppers and other known plants. However, these are only given as examples and should not be understood as limiting the scope of the invention.

In the described embodiments of methods herein, devices and warehouses are shown in which plants grow on a growth medium. In the illustrated embodiments, water is used as a growth medium. The growth medium may also include added substances such as nutritious substances, chemical compounds and other substances used in the cultivation of plants. However, it should be understood that any known growth medium may be used in a method or device according to the present invention. Such growth media may also include earth, rock wool, cocos, synthetic wool, glass wool, oasis or the like.

Figure 1:
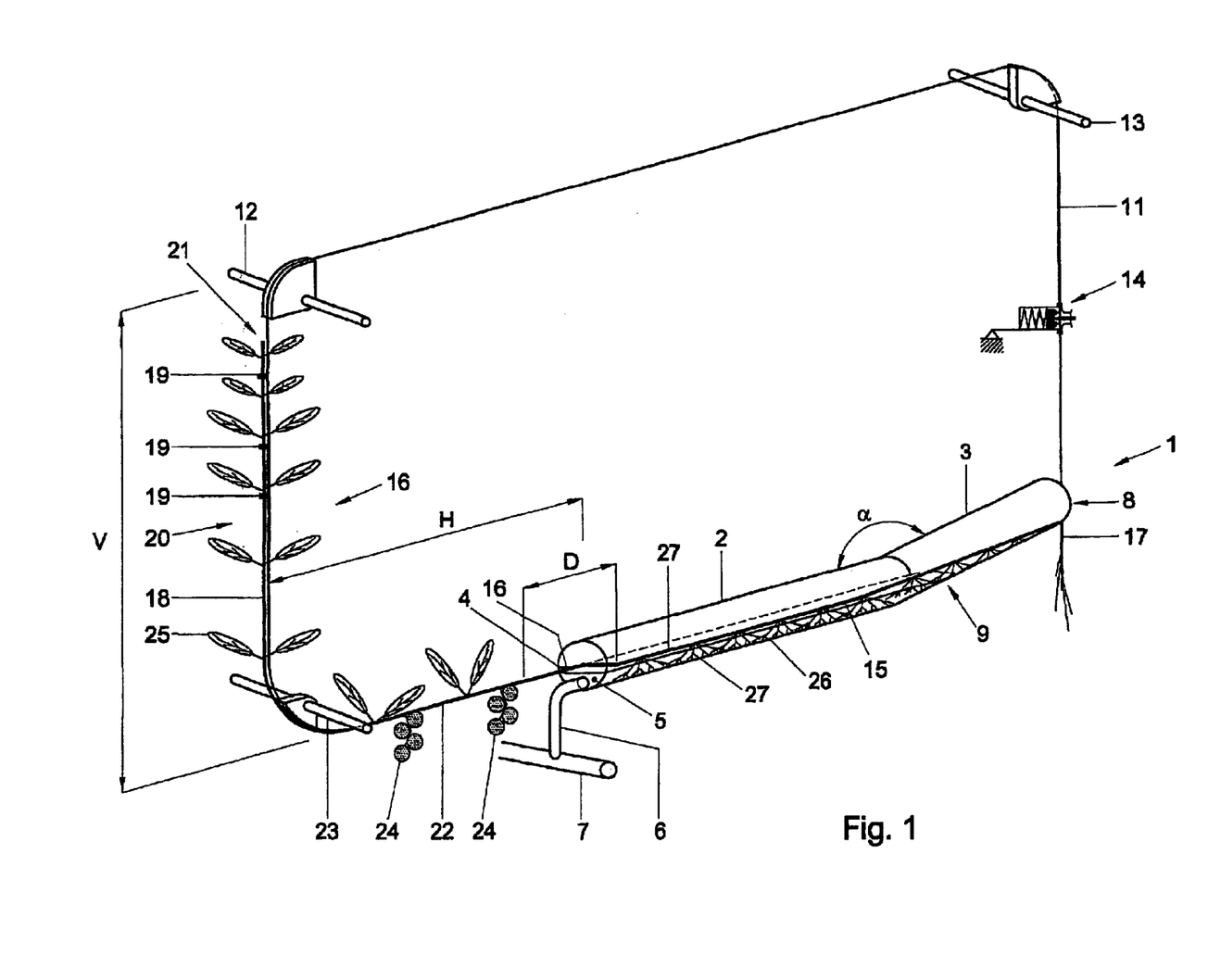
FIG. 1 is a schematic view of a device according to a first embodiment of the present invention.

FIG. 1 shows schematically and in perspective, a first embodiment of a device 1 according to the present invention. The device comprises a first tubular member 2 and a second tubular member 3 connected thereto. The first and second tubular members 2, 3 enclose an angle α. The first tubular member 2 extends substantially horizontally and is at the first end 4 opposite the second tubular member 3 provided with an end plate 5 closing approximately the lower half of the open first end 4. A water pipe 6 extends through the end plate 5 and is connected to a supply pipe 7 through which supply pipe 7 and water pipe 6 supply water comprising, for example, nutritious substances, chemical compounds and the like. The term "water" will be used herein to refer to the water and/or other nutritious substances. The water can be brought into the tubular members 2, 3 and removed therefrom. The tubular members 2, 3, the water pipe 6 and the supply pipe 7 form a tidal system as is commonly known. The second tubular member 3 slopes upward in the direction of its free end 8 opposite the first tubular member 2, such that when water is brought into the first tubular member 2, only a small amount thereof flows into the second tubular member 3. Most of the tubular member 3 extends above the maximum water level 9 as determined by the upper edge 10 of the end plate 5.

Figure 9:
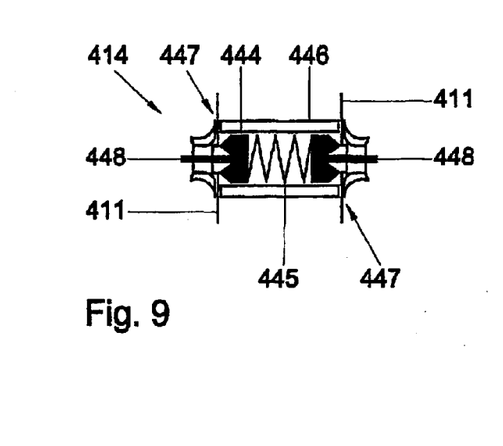
FIG. 9 schematically shows a clamp for wires, used in a device according to the present invention.

A guide wire 11 forms a closed loop and extends through the first and second tubular members 2, 3. The guide wire 11 is guided around a first guide element 12 and a second guide element 13. The first guide element 12 extends in front of and above the first end 4 of the first tubular member 2. The horizontal distance H and the vertical distance V between the first end 4 and the first guide element 12 will be further discussed herein. The second guide element 13 extends approximately above the free end 8 of the second tubular member 3 at approximately the same height as the first guide element 12, although this second guide element 13 may be positioned differently. Somewhere along the guide wire 11, a first clamping means 14 is positioned which can releasably clamp the guide wire 11 to maintain this in a given position. After release of the first clamping means 14, the guide wire 11 can be moved over the guide elements 12, 13 and through the tubular members 2, 3 for reasons to be discussed herein. A double working embodiment of the first clamping means 14 is schematically illustrated in FIG. 9.

Figure 8:
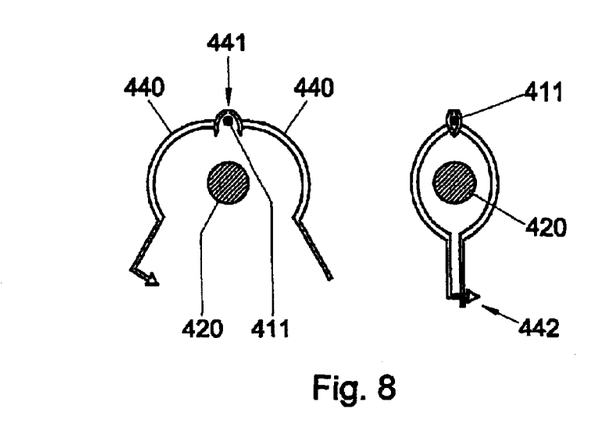
FIG. 8 schematically illustrates a top view of a clamping means for the roots.

In the embodiment of FIG. 1, a root growing part 15 of a shoot-root plant body 16 extends through the first and second tubular members 2, 3, the free end 17 of the root growing part hanging from the free end 8 of the second tubular member 3 outside the device 1. The opposite end of the root growing part 15 is connected to the stem 18 of the plant body, which stem 18 is guided along the guide wire 11 and clamped thereto by second clamping means 19 as shown in FIG. 8 in an open and closed position. With the second clamping means 19, a first part 20 of the stem is connected to the vertical part of the guide wire 11, hanging from the first guide element 12, such that the top 21 of the first stem part 20 extends near the first guide element 12. A second stem part 22 extends between the root growing part 15 and the first stem part 20 extends substantially horizontally along the guide wire 11. A third guide element 23 may be positioned near the transition between the horizontal and vertical parts of the guide wire 11 for guiding the guide wire 11 and the stem parts 20, 22. The horizontal second stem part 22 bears crop 24 approximately ready for harvesting, whereas on the first stem part 20, extending substantially vertically, has new leaves and new crop growing. The leaves 25 on the second stem part 22 will grow at least partly upward, whereas the crop 24 will, due to gravity, hang downwards from the second stem part 22. Therefore, the crop 24 is hanging free from the leaves 25 and the second stem part 22 and can easily be harvested with robotic means which can be driven under the second stem part 22. Robotic harvesting means are well known by those skilled in the art.

The horizontal distance H is preferably such that all crop 24 approximately ready for harvesting grows on the second stem part 22 extending horizontally, whereas the vertical distance V is preferably such that the top 21 extends, or at least grows, to near the first guide element 12. Thus, optimal use can be made of the light and room available for the device and the plants.

During use, crop 24 is harvested from the second stem part 22 after which the guide wire 11 is released by the clamping means 14 and pulled through the tubular members 2 and 3 over, for example, a distance comparable to the horizontal distance H in the direction of the free end 8 of the second tubular member 3 together with the root growing part 15. The free end 17 which was hanging outside the second tubular member 3 has been exposed to daylight and will be dehydrated wherein the roots thereon will have died. By moving around the guide wire 11, the second stem part 22 originally extending horizontally outside the second tubular member 3 will at least partly be moved into the first tubular member 2 after removal of all crop 24 and leaves 25. The top 21 will be moved downward over a similar height, resulting in sufficient space for the top to grow up again in the direction of the first guide means 12. The second clamping means 19, especially the lower ones, may be repositioned into the direction of the top 21 to maintain the connection between the guide wire 11 and the first stem part 20. The second stem part 22 which now extends inside the first tubular member will, at least periodically, be brought into contact with the growth medium, especially the water 26.

On the second stem part 22, new roots 27 will now grow, whereas the roots on at least part of the elder root growing part 15 will die in time. This results in the effect that the distance D between the crop 24 and the roots 27 closest to each other will be kept relatively small and preferably relatively constant during the prolonged life cycle of the root-shoot plant body 16. The overall length of the plant body 16 between the top 21 and the roots 27 will also be kept relatively small in comparison to ordinary methods for cultivating crop plants having a shoot root body, in which the length may, in time, increase up to 10 to 15 meters or more. In a method according to the present invention, the stem length can be kept, for example, between one and five meters, more in particular between two and four meters. In one embodiment for growing tomatoes, the stem length is preferably kept between two and three meters. Generally, the length of the stem of the plant 16 is limited to approximately the part bearing flowers and crop including the growing top.

As can be understood from the description herein, the method according to the present invention periodically pulls the plant body 16 back into the growth medium 26 such that at least part of the stem from which crop has been harvested is brought into contact with the growth medium 26 for growing new roots thereon. Part of the root growing part 15, maximally distanced from the top 21 is made to dehydrate, die or even cut off. This results in a relatively small distance between the roots and the crop growing parts of the plant. Nutrients therefore have to be moved over only a short distance from the roots to the crop and the flowers which results in optimal crop. Moreover, the plant body 16 can be used over a very long period of time, theoretically even endless, resulting in higher productivity, lower costs, higher efficiency, less occupation of space, more constant quality and other advantages.

In a method according to the present invention, the stem parts 22 can, during or previous to movement thereof into the growth medium, be mechanically and/or chemically treated by any commonly known means to initiate or accelerate root growth. Such methods are specifically encompassed within the scope of the present invention. It has been found that enclosing the angle α between the substantially horizontal first tubular member 2 and the second tubular member 3 has an advantageous effect on the root growth. It is believed that positioning a root growing part within the second tubular member 3 or at least distanced relatively far from the crop, at least partly, at a level higher than the root growing part 15 of the plant in the second tubular member 3, or at least a part relatively close to the crop, seems to have the effect that the normal equilibrium in, at least, hormones in the crop plant is disturbed such that lesser root growth inhibiting hormone is transported to the stem and/or more root growing hormone is transported in the direction of the stem part next to the roots which extends inside the first tubular member 2. It appears that disruption of the normal equilibrium initiates or accelerates root growth thereon. It is believed that auxins contribute to this effect. Bringing the end of the root growing part out of contact with growth medium or cutting at least part of the roots off of the root growing part may further enhance this effect. Also, other means known in the art for blocking root growth on the root growing part distanced from the part new roots are growing on may be used to the same effect.

Figure 2:
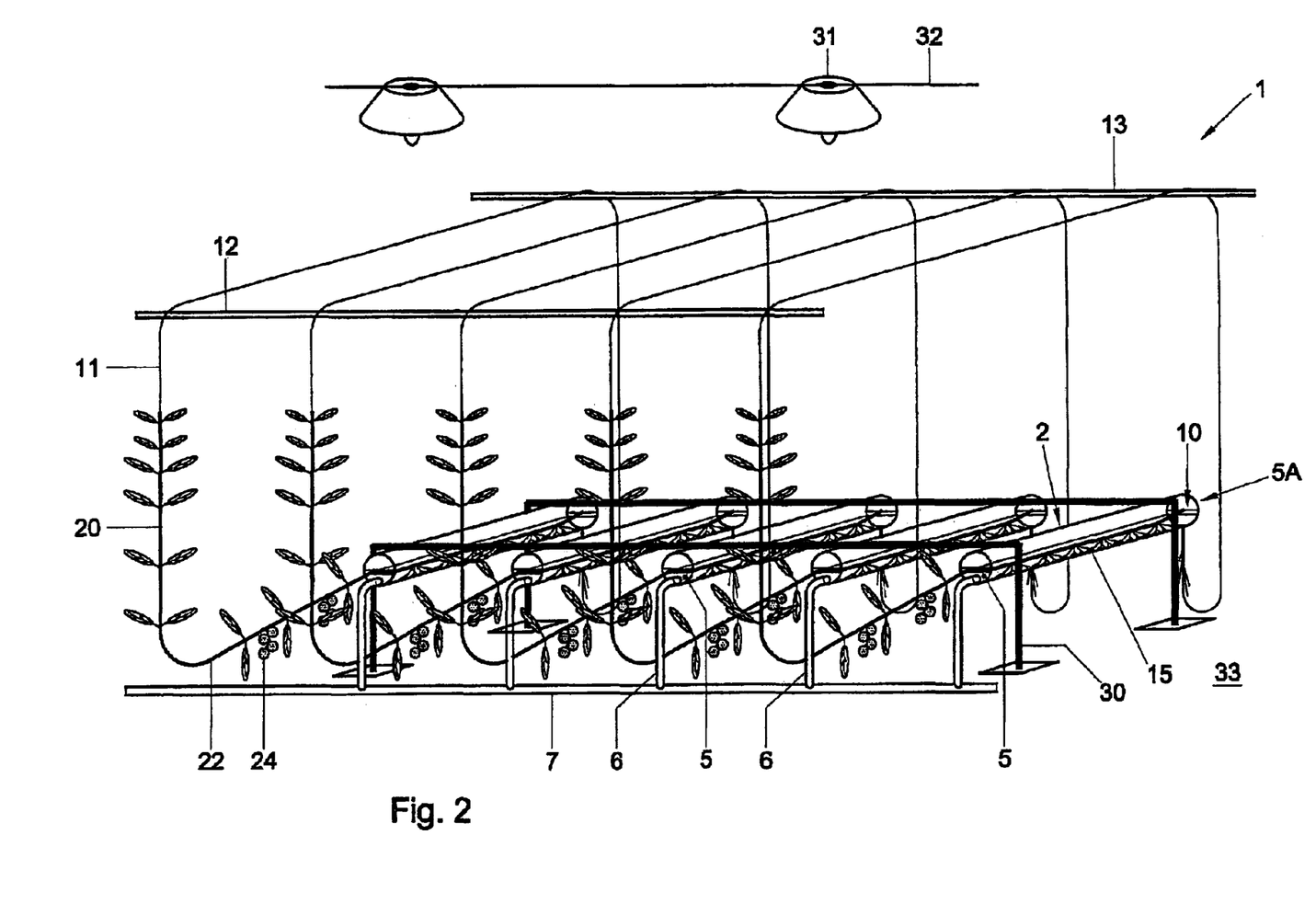
FIG. 2 illustrates a number of devices according to FIG. 1 in a warehouse.

In FIG. 2, five tubular members 2 are shown and positioned parallel to each other. The five tubular members 2 are provided with a guide wire 11 that extends over first and second guide means 12, 13. In illustrated embodiment, the first and second guide means 12, 13 are tubes or rods extending along the guide wires 11. In this embodiment, the tubular member 2 is approximately straight and has an end plate 5 at either side. Both end plates 5 close off approximately the lower half of the relative open end. As is clear from FIG. 2, the first stem part 20 again extends vertically and the second stem part 22 extends substantially horizontally and carries the crop 24 approximately ready for harvesting. The stem is slightly bent when crossing the endplate 5 at the forward end of the tubular member 2 such that the root growing part is positioned somewhat lower than the upper edge 10. At the opposite end, 1 the root growing part 15 extends over the upper edge 10 of the relevant end plate 5A and hangs down approximately vertically. The roots on this hanging part will have died and may be cut off.

The supply pipe 7 extends along the front side of the tubular members 2 which is carried by a frame 30. Water pipes 6 connect the supply pipe 7 to the tubular members 2. The devices 1 of FIG. 2 are positioned in a warehouse, for example a glass warehouse (not shown) as it is commonly known. The guide elements 12, 13 are suspended below a ceiling of the warehouse such that lights 31 can be suspended over the devices 1, for example from a wire 32. The lights may be artificial sunlights as commonly known for crop growing. Since the maximum length and maximum height of the stem, especially of the top 21 above the floor 33 of the warehouse is limited, sufficient space can be obtained between the guide elements 12, 13 and the roof of the warehouse for the lights. The floor 33 is kept free from roots, stems and the like.

Figure 3:
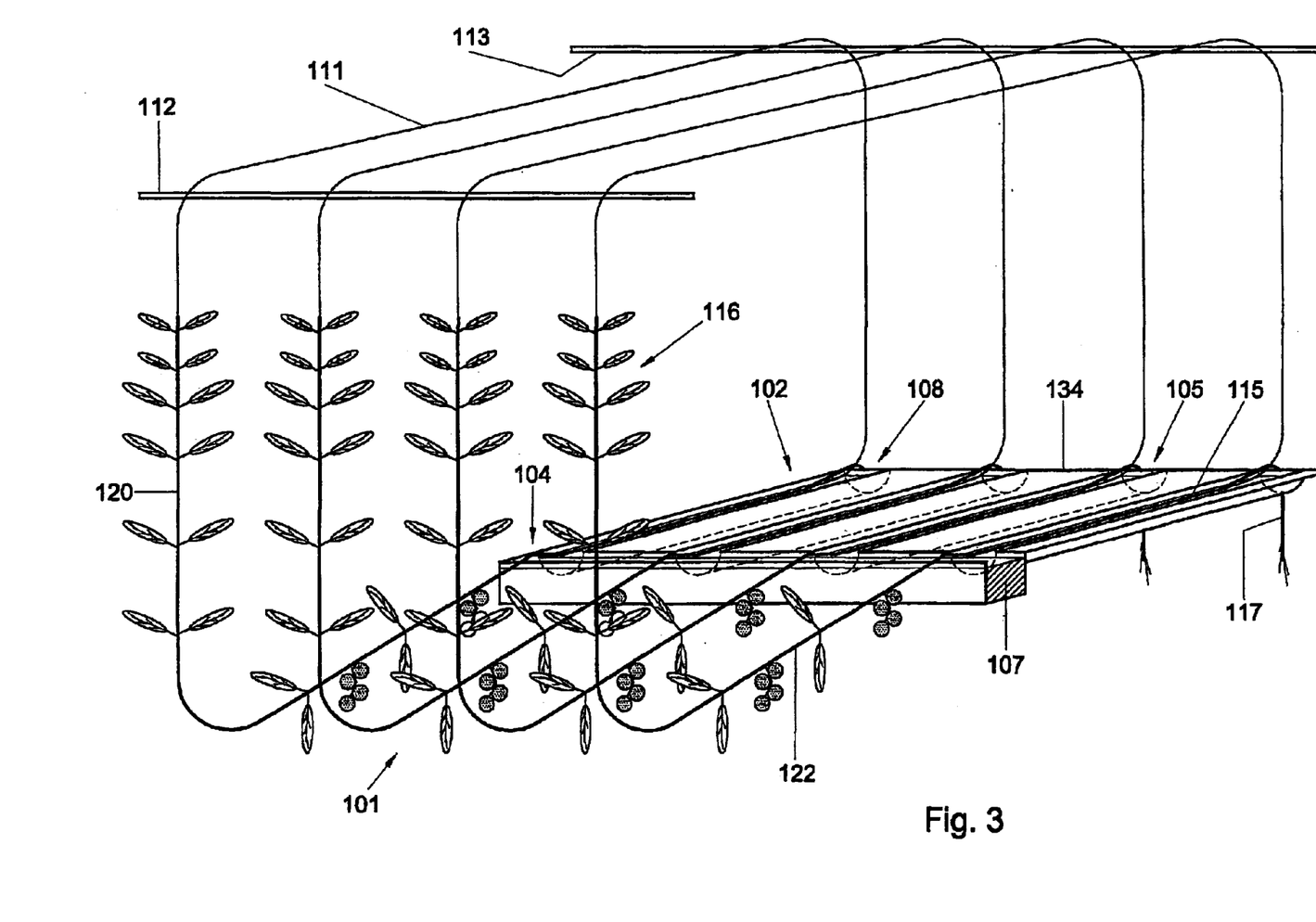
FIG. 3 shows a first alternative embodiment of a device according to the present invention.

In FIG. 3, four guide wires 111 with crop growing plants 116 are shown. The guide wires 111 again being guided over first and second guide elements 112, 113. In this embodiment, a plate shaped element 134 is provided and comprises four half pipe shaped indentations 102 extending parallel to each other. At the forward end 104, the half pipe indentations 102 are open and in fluid connection with a gutter 107 through which water as a growth medium can be brought into and from the half pipe indentations 102 for forming a tidal growth system. The other end 108 are closed by end plates 105. The root growing parts 115 hang over the end plates 105, wherein the free ends 117 hang down and may dehydrate. At the other end, an approximately horizontal crop growing part 22 of the stem is provided and connected to a vertically extending first stem part 120. The devices 101 can be used as described herein with reference to FIGS. 1 and 2 by moving the guide wires 111 around the guide elements 112, 113 and through the half pipe indentations 102. If desired, the half pipe indentations 102 may be covered, for example by light tight foil or plates, to shield the root growing parts from excessive light. The indentations 102 may be made integrally with the plate shaped element 134, the end plates 105 and the gutter 107, for example, by vacuum forming. However, different elements may also be made separately and assembled.

Figure 4:
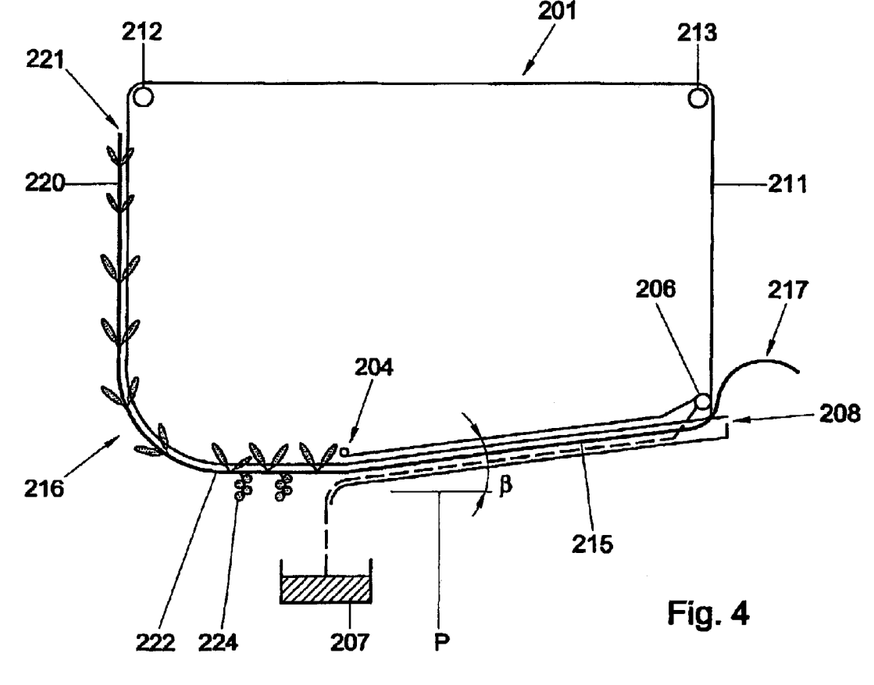
FIG. 4 is a side view a second alternative embodiment of a device according to the present invention.
Figure 5:
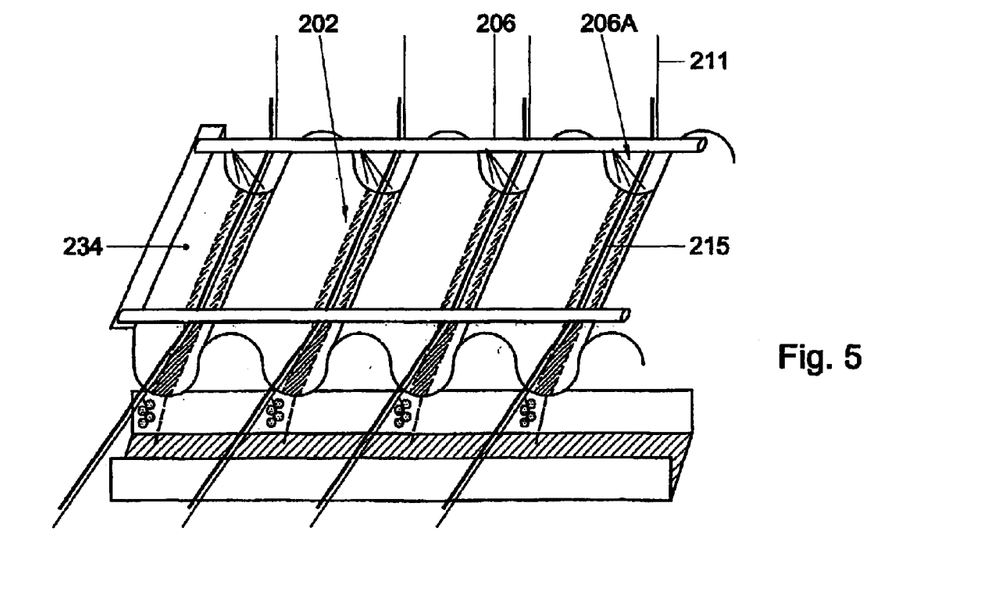
FIG. 5 is a perspective view of part of the device of FIG. 4.

FIGS. 4 and 5 show another embodiment of a device 201 according to the present invention in which an undulated plate 234 is used for providing indentations 202. In this embodiment, the undulated plate 243 encloses an angle β with the horizontal plane P such that a first end 204 of each indentation 202 is positioned lower than a second end 208 thereof. The first end 204 in this embodiment is comparable to the first end 4 of the first tubular member 2 in FIG. 1 and the second end 208 is comparable with the free end 8 of the second tubular member 3 of FIG. 1. The free end 217 of the root growing part 215 of the plant body 216 lies higher than the horizontal second stem part 222 and the crop 224 hanging thereon. The root growing part 215 lies at the bottom of the indentation 202. The indentations 202 are open at both ends 204, 208. Under the first ends 204 of the indentations 202, a gutter 207 extends above the second ends 208 of the indentations 202. A sprinkler tube 206 also extends, which is suitably perforated, and provides openings 206A such that during use, water can be forced through the sprinkler tube 206 and through the openings 206A into the sloping indentations 202 along the relevant root growing part 215 and into the gutter 207 from which it can be recycled. The guide wire 211 is guided around guide elements 212, 213 and around the sprinkler tube 206 such that the guide wire 211 can be rotated as previously described with reference to FIGS. 1–3. The indentations 202 can be covered, for example by foil, to shield the root growing parts 215 from excessive light and from dehydration.

Figure 6:
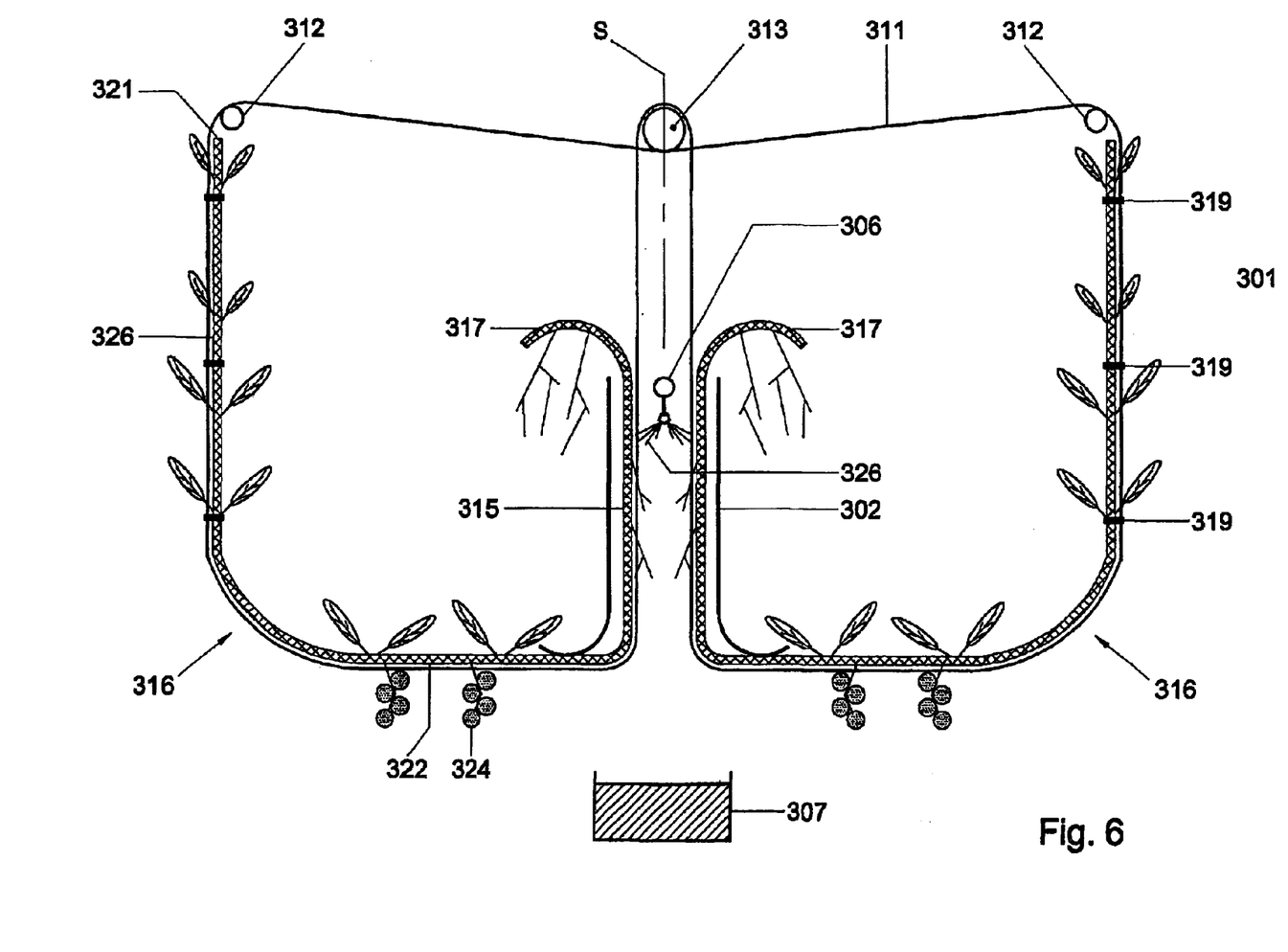
FIG. 6 is a side view of a third alternative embodiment of a device according to the present invention.

FIG. 6 shows another embodiment of a device 301 in which the root growing part 315 of a plant 316 extends substantially vertically and upward from the approximately horizontally extending second stem part 322, substantially parallel to the first stem part 320. In the embodiment shown in FIG. 6, two plants 316 extend symmetrically on either side of a center vertical plane S. In the plane S, a sprinkler tube 306 extends near the upper free ends 317 of the root growing part. Walls 302, for example plastic foil, extend approximately vertically and parallel to the plane of symmetry S on the sides of the root growing parts 315 opposite the plane S. Water 326 can be sprinkler from the sprinkle tube 306 against the root growing parts 315 mainly below the sprinkler tube 306 wherein the free ends 317 therefore dehydrate and slowly die. The free ends 317 can, if desired, be cut off. Excessive water 327 will be gathered in a gutter 307 extending below the walls 302. In the embodiment shown, two guide wires 311 are guided around a first guide element 312 and a shared second guide element 313 for use as previously discussed herein. The first stem parts 320 are connected to the guide wire 311 by clamping means 319.

Figure 7:
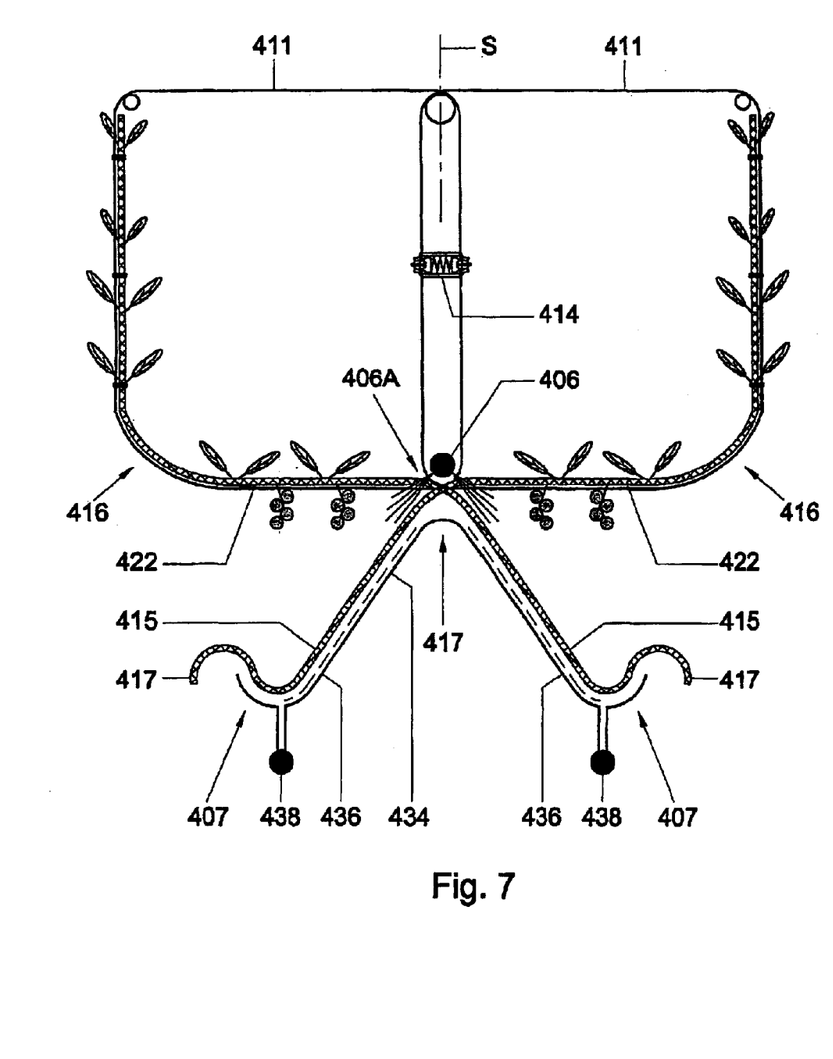
FIG. 7 illustrates a side view a fourth alternative embodiment of a device according to the present invention.

In a further embodiment shown in FIG. 7, two guide wires 411 are provided for two crop plants 416 that extend on either side of a plane of symmetry S perpendicular to the plane of the drawing. In this embodiment, a plate shaped element 434 extends under the guide wires 411 and has a somewhat inverted V-shaped cross-section and the top extends in the plane of symmetry S. The plate 434 comprises two legs 436, which slope from a top 437. At the lower end of each leg 436, a gutter 407 is provided and connected to a water recycling pipe 438. Directly above the top 437, a sprinkler pipe 406 extends parallel to the top 437 which is provided with a series of openings 406A through which water can be sprinkled onto the legs 436 and the root growing parts 415 of the plants 416. The root growing parts 415 of the right leg 436 of FIG. 7 are connected to the second stem part 422 extending to the left of the plane of symmetry S and the root growing part 415 on the left legs is connected to the stem part 422 at the right side of the plane of symmetry S. A double working clamp 414 is positioned in the plane of symmetry, releasably clamping both guide wires 411. In this embodiment, which can be used in a manner similar to the other embodiments described herein, water is gathered in the gutters 407, whereas the free ends 417 extend beyond the gutters and dehydrate there. Since they are positioned higher than the lowest part of the root growing part 415, the equilibrium in hormones will be disturbed.

FIG. 8 shows clamping means 19–419 for clamping the stem 20–420 to the wire 11–411. These clamping means have two legs 440 and are connected by a living hinge 441. In closing the legs 440 against each other a snap lock 442 is obtained that clamps the wire 11–411 and embraces the stem 20–420, preferably with little play. The clamping means 19–419 can be reopened for repositioning.

FIG. 9 schematically illustrates clamping means 14–414 for the guide wire 11–411. These clamping means 14–414 comprise two clamping bodies 444 which are forced apart by a spring 445. The bodies 444 are enclosed within a tubular housing 446 that is provided with two parallel openings 474 through which the guide wires 411 extend. Each body comprises a rod-shaped element 448 that extends through the side of the housing 446 such that by pushing the rod-like elements 448 toward each other, the bodies 444 will be pushed towards each other and compress the spring 445. The bodies 444 are moved away from the guide wires 411 such that the guide wires 411 can be moved. By releasing the bodies 448, the wires are clamped between the housing 446 and the bodies 444 and can therefore not be moved. The housing is positioned stationary and attached to the warehouse. Other types of clamping means may also be used. For a single wire a similar device can be used having only one body.

In the illustrated embodiments, the first stem part 20–420 extends substantially vertical. This is advantageous since space and light are available for optimal growing conditions. However, it will be clear that the first stem part 20–420 may also extend and form an angle with the vertical plane. Similarly, the second stem part 22–422 may form an angle with a horizontal plane, such as for example sloping downward, upward or even extending approximately vertically.

With a device of the present invention, as shown in FIG. 1, crop plants can be grafted by positioning a shoot from a crop growing plant such as a shoot comprising one leaf partly into a tubular member such that the leaf extends outside the tubular member and after root growth is obtained on the part extending in the tubular member. Such can be done during use of the devices 1–401 as previously discussed herein.

Numerous alternative embodiments are possible within the scope of the present invention as described in the claims.

For example, a number of tubular elements or indentations can be positioned beside each other wherein half of the plants are inverted such that of two plants next to each other, the first plant has its crop bearing second stem part 22–422 extending from a first end. In this embodiment, the plant beside the plant having the second stem part 22–422 is extended from the opposite end by rotating the relevant device 1–401 over 180°. This results in the effect that the plants can be positioned closer to each other and necessitating less space.

Other harvesting means can be used, whereas the crop can also be plucked manually. The tubular parts, indentations or plate-shaped elements for carrying the root growing parts can have any desired shape or length necessary or suitable for the relevant shoot-root plant body. Although it is advantageous to position the free end 17–417 of the root growing part 15–415 at a level higher than at least part of the further root growing part, is not necessary. Other means can be used for obtaining root growth on the stem part closest to the crop growing second stem part.

What is claimed is:

1. A method for cultivating plants having a shoot-root plant body, said method comprising:
    growing a plant having a shoot-root plant body;
    preparing a part of a plant stem located between roots and a shoot of the plant such that new roots grow on the part of the plant stem part during growth of the plant; and
    positioning the plant such that the new roots are brought into contact with a growth medium, wherein during production of a crop, a length of the stem between a plant shoot located furthest from the roots and the roots in contact with the growth medium closest to the plant shoot is maintained at a relatively short length as compared to a normal stem length of a plant of a similar age;
    suspending the top of the plant from a suspension means; and periodically lowering of the top of the plant such that the plant can grow back up again along the suspension means; and wherein during or subsequent to the lowering of the top of the plant, the roots are at least partially refracted in a direction away from the top of the plant a similar distance such that the new roots are grown and/or become in contact with the growth medium.

2. The method according to claim 1, wherein the plant stem length is maintained at a substantially constant length during growth.

3. The method according to claim 1, wherein the plant stem length is restricted to substantially the normal crop growing part of the plant.

4. The method according to claim 1, wherein, at least, the stem part on which the new roots are grown is positioned substantially horizontal.

5. The method according to claim 1, wherein, at least part of the roots distanced from the shoot is positioned at a level higher than, at least, another part of the roots and higher than the stem part on which the new roots are grown.

6. The method according to claim 1, further comprising providing means for blocking root growth of the roots distanced from the part of the plant stem the new roots are growing on.

7. The method according to claim 1, further comprising:
    positioning part of the plant stem located next to the part of the plant stem on which the new roots are grown substantially horizontally such that when the plant bears crop, the crop is suspended substantially vertically from the stem part of the plant.

8. The method according to claim 7, wherein the stem is led, at least partly, along a guide means such that of the stem part between the top of the stem and the substantially horizontal part of the stem is suspended substantially vertical.

9. The method according to claim 1, wherein at least the stem is guided by at least one wire element, such that the plant can be moved by movement of the at least one wire element.

10. The method according to claim 9, wherein the plant is connected to the wire element by clamping means which are configured to be repositioned during growing.

11. The method according to claim 1, wherein the crop is harvested by a robotic means, wherein the plant is also handled by the robotic means.

12. The method according to claim 1, wherein the roots are bred on water or a tidal system.

13. The method according to claim 1, wherein the stem is at least mechanically and/or chemically handled locally to induce or expedite the new root growth.

14. The method according to claim 1, wherein at least part of the root bearing part of the plant is periodically cut of.

15. A method for cultivating plants having a shoot-root plant body, said method comprising:
    preparing part of a plant stem such that new roots grow on the plant stem part during growth;
    positioning the plant such that the new roots are brought into contact with a growth medium, wherein during production of a crop, a length of the stem between a plant shoot located furthest from the roots and the roots in contact with the growth medium closest to the plant shoot is maintained at a relatively short length as compared to a normal stem length of a plant of a similar age;
    wherein the plant body is suspended, at least partly, from its top;
    suspending the top of the plant from a suspension means; and
    periodically lowering the top of the plant such that the plant can grow back up again along the suspension means;
    wherein during or subsequent to the lowering of the top of the plant, the roots are at least partially retracted in a direction away from the top of the plant a similar distance such that the new roots are grown and/or become in contact with the growth medium.

16. A method for cultivating plants having a shoot-root plant body, said method comprising:
    preparing a part of a plant stem such that new roots grow on the stem part during growth; and
    positioning the plant such that the new roots are brought into contact with a growth medium, wherein during production of a crop, a length of the stem between a plant shoot located furthest from the roots and the roots in contact with the growth medium closest to the plant shoot is maintained at a relatively short length as compared to a normal stem length of a plant of a similar age;
    wherein, at least part of the roots distanced from the shoot is positioned at a level higher than, at least, another part of the roots and higher than the stem part on which the new roots are grown suspending the top of the plant from a suspension means; and periodically lowering of the top of the plant such that the plant can grow back up again along the suspension means; and wherein during or subsequent to the lowering of the top of the plant, the roots are at least partially.

17. A method for cultivating plants having a shoot-root plant body, said method comprising:

preparing part of a plant stem such that new roots grow on the stem plant part during growth;

positioning the plant such that the new roots are brought into contact with a growth medium, wherein during production of a crop, a length of the stem between a plant shoot located furthest from the roots and the roots in contact with the growth medium closest to the plant shoot is maintained at a relatively short length as compared to a normal stem length of a plant of a similar age;

suspending the top of the plant from a suspension means; and periodically lowering the top of the plant such that the plant can grow back up again along the suspension means;

wherein during or subsequent to the lowering of the top of the plant, the roots are at least partially retracted in a direction away from the top of the plant a similar distance such that the new roots are grown and/or become in contact with the growth medium.

* * * * *

UNITED STATES PATENT AND TRADEMARK OFFICE
CERTIFICATE OF CORRECTION

PATENT NO. : 6,804,912 B2  
APPLICATION NO. : 10/323580  
DATED : October 19, 2004  
INVENTOR(S) : Peter van Weel It is certified that error appears in the above-identified patent and that said Letters Patent is hereby corrected as shown below:

|  | COLUMN 8, | LINE 38, | change "1 the root" to --the root-- |
|  | COLUMN 9, | LINE 54, | change "can be sprinkler" to --can be sprinkled-- |
| CLAIM 1, | COLUMN 11, | LINE 41, | change "refracted" to --retracted-- |
| CLAIM 16, | COLUMN 12, | LINE 67, | change "at least partially." to --at least partially retracted in a direction away from the top of the plant a similar distance such that the new roots are grown and/or become in contact with the growth medium.-- |

Signed and Sealed this

Twentieth Day of February, 2007

JON W. DUDAS  
*Director of the United States Patent and Trademark Office*